United States Patent [19]

Ooka

[11] Patent Number: 5,122,960
[45] Date of Patent: Jun. 16, 1992

[54] LOCATOR FOR A MOVING BODY

[75] Inventor: Akihiro Ooka, Osaka, Japan

[73] Assignee: Sumitomo Electric Industries, Ltd., Osaka, Japan

[21] Appl. No.: 418,863

[22] Filed: Oct. 10, 1989

[30] Foreign Application Priority Data

Oct. 14, 1988 [JP] Japan .................. 63-259862

[51] Int. Cl.⁵ .................. G06F 15/50
[52] U.S. Cl. .................. 364/449; 364/453; 364/457; 33/356
[58] Field of Search .......... 364/443, 449, 454, 457, 364/453; 33/356, 357; 73/178 R

[56] References Cited

U.S. PATENT DOCUMENTS

| | | | |
|---|---|---|---|
| 4,429,469 | 2/1984 | Tsushima et al. | 33/356 |
| 4,459,667 | 7/1984 | Takeuchi | 364/449 |
| 4,688,176 | 8/1987 | Hirata | 364/449 |
| 4,743,913 | 5/1988 | Takai | 33/356 |
| 4,791,574 | 12/1988 | Thoone et al. | 33/356 |
| 4,862,398 | 8/1989 | Shimizu et al. | 364/449 |
| 4,887,081 | 12/1989 | Iihoshi et al. | 33/356 |
| 4,890,233 | 12/1989 | Ando et al. | 364/457 |

Primary Examiner—Gary Chin
Attorney, Agent, or Firm—Lane, Aitken & McCann

[57] ABSTRACT

In a locator for location and direction detections of moving bodies which employs, in the direction detection, a magnetic direction sensor for outputting direction data and a gyro for outputting angular speed data, the locator for location and direction detections of moving bodies comprising a normal judgement function for the magnetic direction sensor which compares a direction variation quantity within an assigned time which is obtained from the difference of the direction data of the magnetic direction sensor, and an angle variation quantity within the assigned time which is obtained from an integral value of the angular speed data of the gyro, and in the case that the difference between the compared quantities is over a first predetermined value, judges that an error has occurred in the direction data of the magnetic direction sensor. After judgement of an occurrence of the error and when the difference between the direction variation quantity and the angle variation quantity is below a second predetermined value, it is judged that the direction data of the magnetic direction sensor has returned to normalcy.

7 Claims, 3 Drawing Sheets

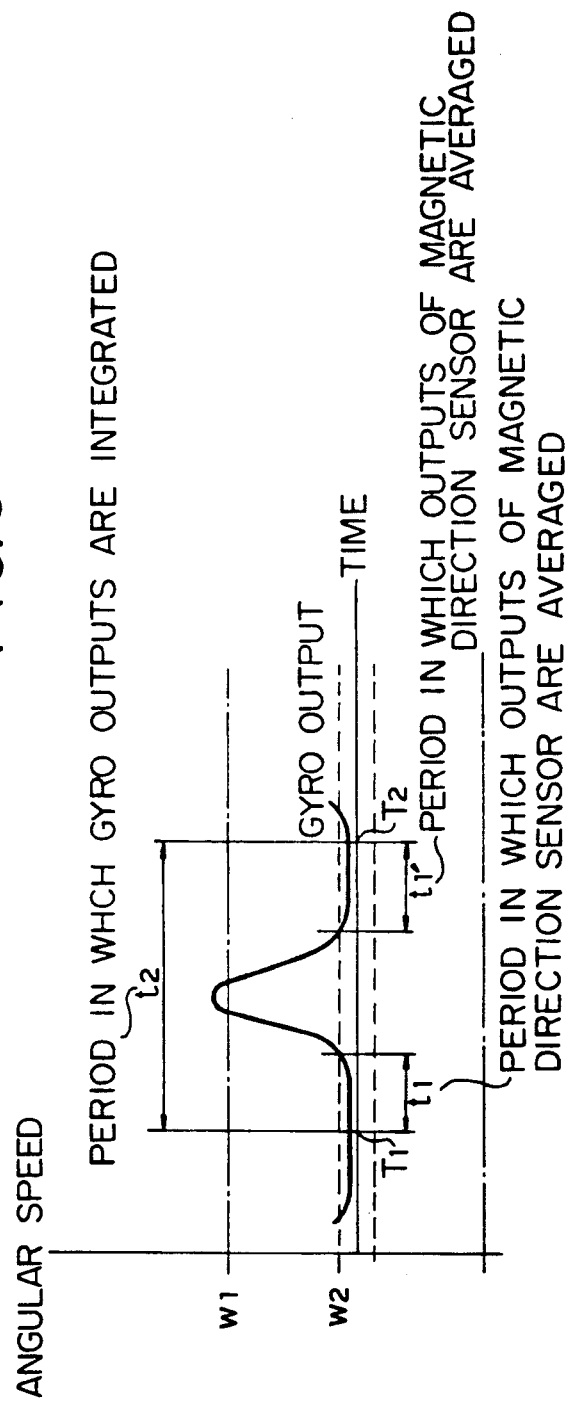

LOCATOR FOR A MOVING BODY

FIELD OF THE INVENTION

The present invention relates to a locator that detects the location and direction of moving bodies such as motor vehicles and the like, and in particular to such a locator wherein the reliability of detection is enhanced by a normal judgement function for judging whether the direction data obtained from a magnetic direction sensor is normal or not.

DESCRIPTION OF THE PRIOR ART

In the locators normally employed in motor vehicles, there are provided a speed sensor for vehicle-speed detection, and a magnetic direction sensor for detecting an absolute direction, and in order to obtain a direction angle variation, there are also provided wheel-speed sensors for detecting the rotational speed difference of left and right wheels, or a gyro.

The magnetic direction sensor is mainly used in the determination of the traveling direction of vehicles, and the output of the wheel-speed sensors or gyro is used in the detection of the right and left turns at intersections and the like by an angular speed variation.

Since the detection of a present location by the locator is computed from two data that are obtained by sequentially detecting the speed of a moving body and the traveling direction at that point in time, it is desired that errors in the direction detection be as few as possible, and that the return of a normal value be made as soon as possible, if errors would arise.

The magnetic direction sensor however has its disadvantage in that a correct direction detection cannot be performed in the place where the direction of terrestrial magnetism undergoes the influence of magnetic materials and is deflected. Also, in the direction detection by the integration of direction angle variations based on the difference between the outputs of right and left vehicle-speed sensors or by the integration of angular speed variations of gyro outputs, there is the problem that errors resulting from the integration are accumulated. Further, in the detection of a direction angle variation quantity by wheel speeds, there also occur detection errors caused by unavoidable phenomenons such as slips and the like. Consequently, the conventional locator has its disadvantage in that the reliability of location detection is not satisfactory.

It is accordingly an object of the present invention to provide an improved locator for location and direction of moving bodies which can eliminate the drawbacks as produced by the conventional locator and which can enhance the reliability of location detection.

SUMMARY OF THE INVENTION

In order to eliminate the problems associated with the conventional locator, there is provided, in accordance with the present invention, normal judgement means for judging whether the output of a magnetic direction sensor is normal or not on the basis of relatively correct output data of a gyro, by the fact that the gyro output is relatively correct for an angular speed or angle variation quantity of a short time. The normal judgement is performed as follows.

That is, a direction variation quantity is computed from the difference of outputs of the magnetic direction sensor within an assigned time, while the angle variation quantity is computed from the integrated value of the gyro outputs within the assigned time. The calculated direction variation quantity and angle variation quantity are compared, and if the difference therebetween exceeds a predetermined value, it is then judged that an error has occurred in the direction data of the magnetic direction sensor. After judgement of this error, if the difference between the calculated direction variation quantity and angle variation quantity within the predetermined time becomes below a predetermined value, it is judged that the direction data of the magnetic direction sensor has returned to normalcy. Such judgement of normal return may be limited to the case where an angular speed data exceeding a predetermined value is included in the gyro outputs within the predetermined time. By this, the normal return judgement of the magnetic direction data is to be performed using the data at the time a moving body has turned.

It is noted that the time of the normal return judgement of the magnetic direction data may be limited to the case where the aforesaid angle variation quantity within the assigned time exceeds a predetermined value and also the assigned time is below a predetermined time.

Also, instead of comparing the direction variation quantity computed from the output difference of the magnetic direction sensor within the assigned time, and the angle variation quantity computed from the integrated value of the gyro outputs within the assigned time, the angle variation quantity during times, which times are before and after a period in which an angular speed is over a predetermined value and in which times the variation of angular speeds is few, may be compared with the direction variation quantity obtained from the magnetic direction sensor within the times. In that case, the aforementioned normal return judgement of the magnetic direction data is performed only when it is clear that a moving body has turned.

Although such comparison of variation quantities is performed in the case that a moving body has turned from a straight road to the right or the left, it is noted that, in order to increase noise resistance, direction variation quantity may also be computed by averaging the output values of the magnetic direction sensor within the period in which the variation corresponding to the traveling direction in the road before the right or left turn is few and averaging the output values of the magnetic direction sensor within the period in which the variation corresponding to the traveling direction in the road after the right or left turn is few, and the difference between the average direction values may be compared with the aforesaid angle variation quantity within the assigned time.

As previously described, the normal judgement can compensate the disadvantages of the magnetic direction sensor and gyro.

That is, when the data from the magnetic direction sensor is normal, it is preferentially used in the direction detection of moving bodies, since the magnetic direction sensor does not have the problem of accumulation of errors associated with the gyro. When, on the other hand, an error has occurred in the direction data of the magnetic direction due to deflection of the magnetic direction sensor, the angle variation quantity computed from the integrated value of the gyro outputs is preferentially used in the direction detection of moving bodies. When the direction data of the magnetic direction sensor has returned to normalcy, the data is again used preferentially. Consequently, errors in the direction detection can be reduced. If micro noises in the output data of the magnetic direction sensor is removed, the detection error will be further reduced.

If the period in which the gyro output is preferentially used becomes longer and longer, it is necessary to reduce the detection error by using an expensive gyro which has a correction function for correcting the errors accumulated by integration. As a result, the cost of the locator is increased. However, in the locator of the present invention as constructed above, the need of an expensive gyro can be eliminated, since the direction data of the magnetic direction sensor is preferentially used soon after normal return.

The variation to error state from normal state (occurrence of error) can be sufficiently detected even when a vehicle is travelling to a constant direction, since the normal judgement is performed when a compared value exceeds a predetermined value. However, in the judgement of normal return from error state, if the normal judgement is performed only at the time of straight travel, there will be the possibility of lacking the reliability of judgement. That is, if only data at the time of straight travel is used in the normal return judgement, the magnetic direction sensor indicates a constant direction with errors and the direction variation within a certain time becomes zero, depending on the extent of a region wherein deflection of terrestrial magnetism occurs. Of course, the angle variation of the gyro in that time is zero, and there is therefore the possibility of judging by mistake that the output data of the magnetic direction sensor has returned to normalcy.

Therefore, it is preferable that the judgement of normal return be performed on the basis of the data when the direction of a vehicle angle is clearly changed like right or left turn. In this respect, the reliability of judgement will be further enhanced in an apparatus provided with a limited condition of judgement time which is again described in a preferred embodiment presented below.

BRIEF DESCRIPTION OF THE DRAWINGS

The above and other objects and advantages will become apparent from the following detailed description when read in conjunction with the accompanying drawings wherein:

FIG. 3 is a graph which serves to explain the case that, instead of the direction variation quantity, the difference between average values obtained from the magnetic direction sensor outputs is compared with the angle variation quantity.

DESCRIPTION OF THE PREFERRED EMBODIMENT

Figure 1:
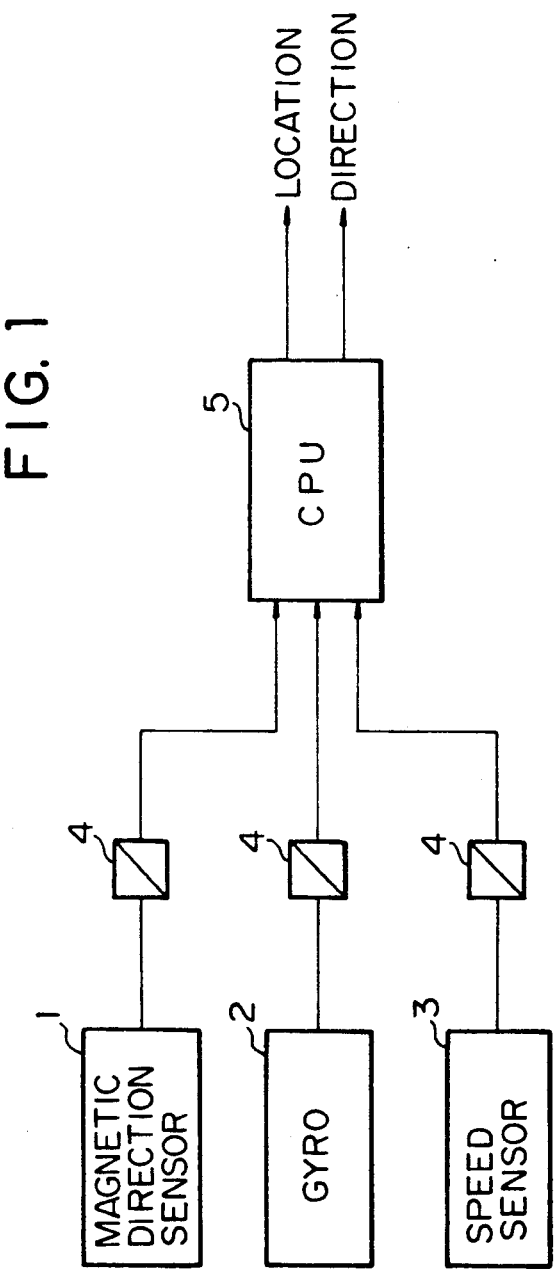
FIG. 1 is a block diagram illustrating schematically a locator according to the present invention.

Referring to FIG. 1 of the drawings, there is shown a preferred embodiment of a locator in accordance with the present invention.

As shown in FIG. 1, the outputs of a magnetic direction sensor 1, a gyro 2 and a speed sensor 3 are respectively inputted through A/D (analog/digital) converts 4, 4 and 4 to a CPU (central processing unit) 5, wherein operation process is performed.

Figure 2:
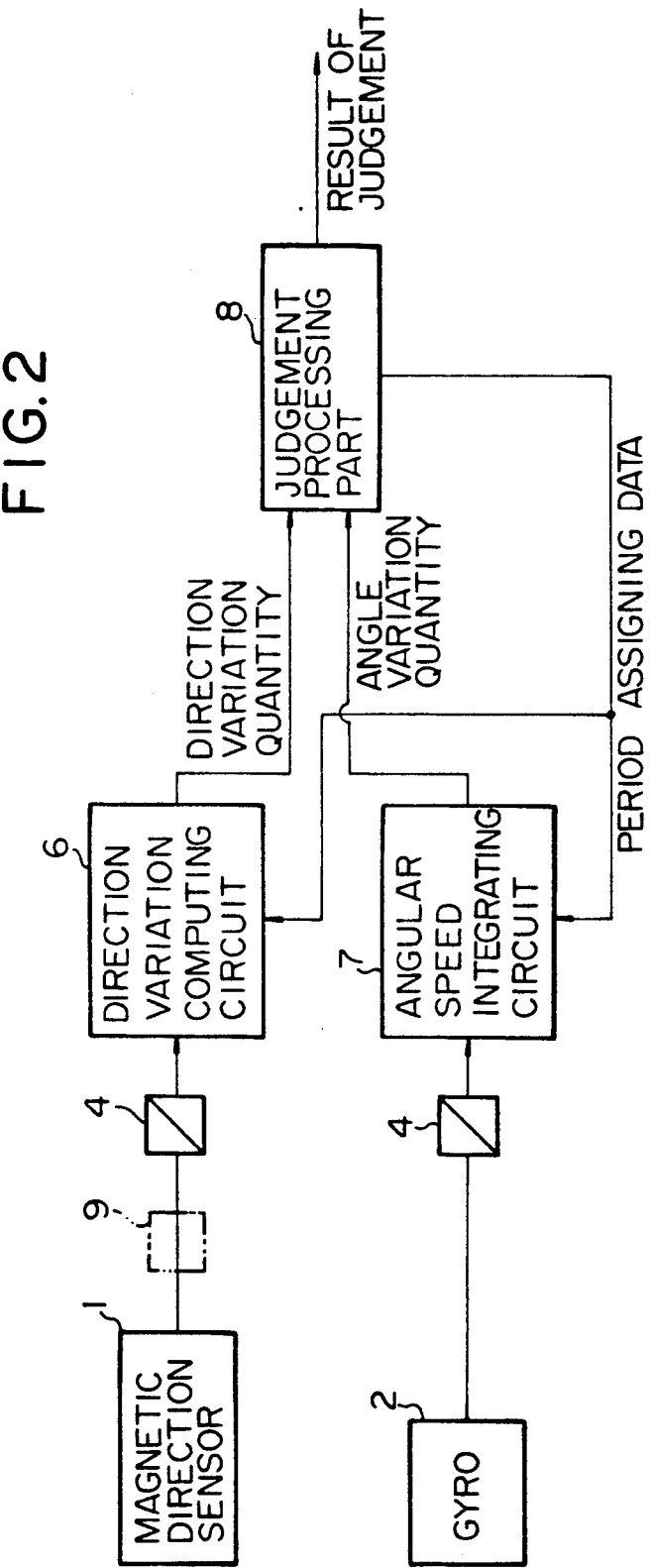
FIG. 2 is a block diagram of a normal judgement function that is used in the comparison of a direction variation quantity obtained from the magnetic sensor of FIG. 1 and an angle variation quantity obtained from the gyro of FIG. 1.

FIG. 2 is a block diagram showing a normal judgement function of direction data obtained from the magnetic direction sensor 1. The output of the magnetic direction sensor 1 is inputted through the A/D converter 4 to a direction variation computing part 6, while the output of the gyro 2 is inputted through the A/D converter 4 to an angular speed integrating part 7. To the parts 6 and 7 are inputted period assigning data from a judgement processing part 8. If now a assigned period is from T1 to T2, the direction output of the magnetic direction sensor 1 at the time T1 is defined in terms of A(T1), the direction output of the magnetic direction sensor 1 at the time T2 is defined in terms of A(T2), and the angular speed output of the gyro 2 is defined in terms of w(t), a direction variation quantity signal of | A(T2) − A(T1) | is inputted from the direction variation computing part 6 to the judgement processing part 8 including a comparison circuit, and also an angle variation quantity signal of $$\left| \int_{T1}^{T2} w(t)dt \right|$$

is inputted from the angular speed integrating part 7 to the judgement processing part 8. The difference between the both signals is obtained by the following equation.

$$\theta = \left| \{A(T2) - A(T1)\} - \int_{T1}^{T2} w(t)dt \right| \quad (1)$$

When the $\theta$ of the equation (1) is greater than a predetermined value C1, the judgement processing part 8 judges that an error has occurred in the magnetic direction. When, on the other hand, the $\theta$ is smaller than a predetermined value C2, the judgement processing part 8 judges that the magnetic direction has returned to normalcy. The results of these judgements are outputted.

It is noted that, in the case of judging whether the magnetic direction data has returned to normalcy or not, the following conditions (i) and (ii) may be set and the execution period specified.

(i) In t=T1∼T2, an output of | w(t) |>C3 exists during the period of t.

(ii) An output of $$\left| \int_{T1}^{T2} w(t)dt \right| > C4$$

exists during the period of t and also (T2−T1)<T (a predetermined time).

The predetermined values C1 and C2 may be the same value, or different from each other. In order to remove micro noises which tend to be mixed into the output data of the magnetic direction sensor, a low-pass filter can be provided as shown by the broken lines in FIG. 2.

FIG. 3 is a diagram which serves to explain the case that, instead of the direction variation quantity obtained from the output difference of the magnetic direction sensor 1 during the assigned period from T1 to T2 (indicated by t2), the difference between before and after averaged direction detection data is used in the comparison with the angle variation quantity. As shown in FIG. 3, the period t2 is one which includes periods t1 and t1', wherein lower outputs than an output w2 exist, before and after an gyro output exceeding w1. The outputs of the magnetic direction sensor during the period t1 are averaged and the outputs during the period t1' are averaged. The $\theta$ of the equation (1) is obtained by substituting the average value of the period t1 for the A(T1) of the equation 1 and the average value of the period t1' for the A(T2) of the same equation.

As described above, the present invention has its advantage in that an accuracy of location detection of moving bodies can be enhanced using only direction data of high reliability, since the normal judgement of output data of the magnetic direction sensor is performed on the basis of the integral data (angle variation quantity) of the gyro outputs of a relatively short time, which gyro outputs do not undergo the influence of magnetism and do not have error accumulation.

In addition, since the normal return of the magnetic direction data is judged quickly, direction data of few errors are obtained, and the cost of apparatus becomes inexpensive.

While the subject invention has been described with relation to the preferred embodiment thereof, various modifications and adaptations thereof will now be apparent to those skilled in the art. All such modifications and adaptations as fall within the scope of the appended claims are intended to be covered thereby.

What I claim is:

1. A locator for location and direction detections of moving bodies comprising:
   a magnetic direction sensor for outputting direction data;
   a gyro for outputting angular speed data;
   a direction variation computing means for computing a direction variation quantity within an assigned time from a difference of said direction data of said magnetic direction sensor;
   an angular speed integrating means for computing an angle variation quantity within said assigned time from an integral value of said angular speed data of said gyro; and
   a normal judgement means for said magnetic direction sensor which compares said direction variation quantity within said assigned time with said angle variation quantity within said assigned time, and in the case that a difference between the compared quantities is over a first predetermined value, judges that an error has occurred in said direction data of said magnetic direction sensor, and after judgement of an occurrence of said error and when said difference between said direction variation quantity and said angle variation quantity is below a second predetermined value, judges that said direction data of said magnetic direction sensor has returned to normalcy.

2. A locator for location and direction detections of moving bodies as set forth in claim 1, wherein, when an absolute value of said angular speed data of said gyro within said assigned time exceeds a predetermined constant value, said normal judgement means judges whether said direction data of said magnetic direction sensor has returned to normalcy or not.

3. A locator for location and direction detections of moving bodies as set forth in claim 1, wherein, when an absolute value of said angle variation quantity within said assigned time exceeds a predetermined constant value and also said assigned time is below a predetermined time, said normal judgement means judges whether said direction data of said magnetic direction sensor has returned to normalcy or not.

4. A locator for location and direction detections of moving bodies as set forth in claim 2, wherein said assigned time comprises first and second periods wherein absolute values of said angular speed data of said gyro are below a first reference value, and a third period between said first and second periods wherein an absolute value of said angular speed data of said gyro is above a second reference value greater than said first reference value.

5. A locator for location and direction detections of moving bodies as set forth in claim 3, wherein said assigned time comprises first and second periods wherein absolute values of said angular speed data of said gyro are below a first reference value, and a third period between said first and second periods wherein an absolute value of said angular speed data of said gyro is above a second reference value greater than said first reference value.

6. A locator for location and direction detections of moving bodies as set forth in claim 4, wherein instead of said direction variation quantity within said assigned time, the difference between an average value of said direction data of said magnetic direction sensor during said first period and an average value of said direction data of said magnetic direction sensor during said second period is compared with said angle variation quantity within said assigned time.

7. A locator for location and direction detections of moving bodies as set forth in claim 5, wherein instead of said direction variation quantity within said assigned time, the difference between an average value of said direction data of said magnetic direction sensor during said first period and an average value of said direction data of said magnetic direction sensor during said second period is compared with said angle variation quantity within said assigned time.

* * * * *